United States Patent [19]

Watanabe

[11] Patent Number: 4,476,930
[45] Date of Patent: Oct. 16, 1984

[54] INHIBITION OF SCALE DEPOSITION FROM STEAM GENERATION FLUIDS

[75] Inventor: David J. Watanabe, Orange, Calif.

[73] Assignee: Union Oil Company of California, Los Angeles, Calif.

[21] Appl. No.: 410,318

[22] Filed: Aug. 23, 1982

[51] Int. Cl.$^3$ .................. E21B 37/00; E21B 43/12
[52] U.S. Cl. .................. 166/279; 60/641.5; 166/244 C; 166/310; 166/312; 166/371; 252/8.55 B; 252/8.55 E
[58] Field of Search ............ 166/244 C, 265, 266, 166/267, 279, 302, 305 R, 310, 312, 371; 60/641.2–641.5; 137/13, 14; 252/8.55 B, 8.55 E

[56] References Cited

U.S. PATENT DOCUMENTS

| | | |
|---|---|---|
| 2,238,671 | 4/1941 | Woodhouse . |
| 2,357,559 | 9/1944 | Smith .................. 252/8.55 E X |
| 2,629,649 | 2/1953 | Wachter et al. ............ 252/8.55 E |
| 2,689,230 | 9/1954 | Cardwell et al. . |
| 2,824,833 | 2/1958 | Cardwell et al. . |
| 2,889,276 | 6/1959 | Barrett et al. . |
| 3,134,759 | 5/1964 | Kirkpatrick et al. ...... 252/8.55 E X |
| 3,151,138 | 9/1964 | Fischer .................. 252/8.55 E X |
| 3,579,445 | 5/1971 | Tate ..................... 252/8.55 B X |
| 3,613,788 | 10/1971 | Kautsky . |
| 3,639,279 | 2/1972 | Gardner et al. ........... 252/8.55 B X |
| 3,656,551 | 4/1972 | Biles . |
| 3,749,554 | 7/1973 | Fischer et al. ........... 252/8.55 E X |
| 3,782,468 | 1/1974 | Kuwada .................. 166/279 X |
| 3,951,794 | 4/1976 | Swearingen . |
| 3,958,635 | 5/1976 | Zilch et al. ............. 166/244 C |
| 4,032,460 | 6/1977 | Zilch et al. . |
| 4,054,175 | 10/1977 | Swearingen .............. 60/641.2 X |
| 4,092,252 | 5/1978 | Fischer et al. . |
| 4,238,349 | 12/1980 | Larsen et al. . |
| 4,360,547 | 11/1982 | Asperger ................. 60/641.3 X |

OTHER PUBLICATIONS

"A Brine Treatment Process Spurs Geothermal Progress", *Chemical Engineering*, Mar. 7, 1983, pp. 55, 56.

"Experience in Scale Control With East Mesa Geothermal Brine", T. E. Lindemuth, E. H. Houle, S. H. Suemoto and V. C. Van Der Mast.

"A Survey of Treatment Methods for Geothermal Fluids", S. L. Phillips, A. K. Mathur and R. E. Doebler.

"On-Line Tests of Organic Additives for the Inhibition of the Precipitation of Silica from Hypersaline Geothermal Brine II, Tests of Nitrogen-Containing Compounds, Silanes and Additional Ethoxylated Compounds", J. E. Harrar, F. E. Locke, C. H. Otto, Jr., L. E. Lorensen & W. P. Frey.

*Primary Examiner*—George A. Suchfield
*Attorney, Agent, or Firm*—Dean Sandford; Gregory F. Wirzbicki; Gerald L. Floyd

[57] ABSTRACT

A method for treating a hot water-containing fluid stream passing through a conduit, under conditions of temperature and pressure whereupon at least a portion of the water flashes to steam, to inhibit the formation of scale deposited on the conduit and/or dissolve any such scale already formed, and to inhibit corrosion of the conduit wherein there is added to the fluid stream an effective amount of a solution of a water-soluble compound which provides a nitrogen-containing cation capable of flashing to become a gas at high temperatures selected from the group consisting of ammonium halides, ammonium salts of inorganic acids, ammonium salts of organic acids, ammonium salts of alpha hydroxy organic acids, quaternary ammonium halides, quaternary ammonium salts of inorganic acids, quaternary ammonium salts of organic acids, amine salts of inorganic acids, amine salts of organic acids and amides. Optionally the solution or dispersion also contains a water-soluble or dispersible polymer and/or a buffering agent.

32 Claims, No Drawings

INHIBITION OF SCALE DEPOSITION FROM STEAM GENERATION FLUIDS

BACKGROUND OF THE INVENTION

1. Field of the Invention

This invention relates to a method for treating a liquid water-containing fluid stream being transported through a conduit in which at least a portion of the liquid water flashes to steam during transit. More particularly, the invention relates to such a method wherein the hot liquid water-containing fluid stream tends to build up a scale and/or corrode the surfaces of the conduit with which it comes in contact. By use of the method of this invention, the build up of scale is inhibited and/or any scale already formed is at least partially removed, and corrosion is mitigated.

2. Description of the Prior Art

Many industrial operations involve passing a hot water-containing fluid stream through a conduit under conditions, such as a lowering of the pressure, at which at least a portion of the hot water flashes to steam. If the hot water is a brine containing appreciable amounts of dissolved salts, this flashing is often accompanied by the formation of scale on the surfaces of the conduit contacted by the hot water-containing fluid stream. This deposition of scale tends to build up over a period of time and restrict further fluid flow through the conduit. This necessitates either operation at a reduced flow rate or an increase in the amount of power used to move the fluid through the conduit. In extreme cases, the conduit can become completely plugged with scale, and the industrial operation must be shut down for maintenance. An example of such an industrial operation involves the generation of steam which can be used as a source of heat or to generate power. Various methods of generating steam utilize fossil-fuel steam generators, nuclear steam supply systems and geothermal steam generator units.

Various proposals have been made to decrease the scale formation and/or corrosion in steam generating equipment. These methods include the addition to the feedwater of such materials as sodium phosphate to precipitate calcium ions and other hardness constituents present, sodium hydroxide to raise the pH of the system, a complex metal-chelating compound such as ethylenediamine tetracetic acid or nitrilotriacetic acid to complex the hardness constituents, and a neutralizing or filming compound such as ammonia, morpholine, cyclohexylamine, hydrazine, or octadecylamine acetate to produce an alkaline gas in the steam and react with the acidic gases produced from the feedwater.

The report "On-Line Tests of Organic Additives for the Inhibition of the Precipitation of Silica from Hypersaline Geothermal Brine II. Tests of Nitrogen-Containing Compounds, Silanes, and Additional Ethoxylated Compounds", J. E. Harrar, F. E. Locke, C. H. Otto, Jr., L. E. Lorensen and W. P. Frey, Lawrence Livermore Laboratory, Prepared for U.S. Department of Energy under contract No. W-7405-Eng-48, June 1, 1979 describes several classes of organic compounds which were screened as potential geothermal scale control agents. The leading antiscalant candidate was Ethoquad 18/25, methylpolyoxyethylene (15) octadecylammonium chloride. Similar quaternary ammonium compounds tested included dimethyl benzyl, coco, tallow and trimethyl ammonium chloride derivatives.

While each of the aforementioned treatments has met with some success in particular applications, the need exists for a further improved well treating process to reduce scale deposition and corrosion of metal equipment during the production and subsequent handling of well fluids containing hot brine, especially geothermal fluids.

Accordingly, it is a principal object of this invention to provide a method for inhibiting the deposition of scale onto and the corrosion of fluid handling equipment contacted by a hot water-containing fluid stream and for removing such scale from such surfaces.

It is a further object of this invention to provide such a method wherein the hot water-containing fluid stream is a steam generating fluid stream.

It is a still further object of this invention to provide such a method wherein the steam generating fluid is a geothermal fluid.

It is a still further object of this invention to provide such a method wherein the geothermal fluid comprises principally an aqueous brine.

It is another object of this invention to provide such a method wherein a treating material is admixed with the feedwater prior to the generation of the major proportion of the steam.

It is yet another object of this invention to provide such a method wherein the treating material is bled into a geothermal fluid at or near the producing interval of a well as the geothermal fluid is produced from a reservoir.

It is yet another object of this invention to provide such a method wherein the treating material is injected into the formation penetrated by a geothermal well.

Other objects, advantages and features of the invention will be apparent from the following description and appended claims.

SUMMARY OF THE INVENTION

Briefly, the invention provides a method for treating a hot liquid water-containing fluid stream passing through a reservoir or a conduit, which water contains dissolved salts, in which reservoir or conduit at least a portion of the liquid water flashes to steam, to inhibit the formation of scale from the dissolved salts deposited on the reservoir or conduit and/or dissolve any such scale previously formed and to inhibit corrosion of the conduit wherein there is added to the hot liquid water-containing fluid stream prior to the flashing a treating solution of a water-soluble compound which provides a nitrogen-containing cation capable of flashing to become a gas at high temperatures selected from the group consisting of ammonium halides, ammonium salts of inorganic acids, ammonium salts of organic acids, ammonium salts of alpha hydroxy organic acids, quaternary ammonium salts of inorganic acids, quaternary ammonium salts of organic acids, amine hydrochlorides, amine salts of inorganic acids, amine salts of organic acids and amides. Optionally, the added solution also contains a water-soluble or dispersible polymer. Also the treating solution can optionally contain an effective amount of a buffering agent which is especially useful when the treating solution is used to remove scale already formed in a reservoir or a conduit.

DETAILED DESCRIPTION OF THE INVENTION

In many industrial operations, a fluid stream containing liquid hot water, which water contains dissolved solids is passed through a conduit. Depending on the temperature and pressure conditions of the fluid stream, it can be composed entirely of a liquid hot water or a mixture of such water and steam. For example, geothermal fluids in subterranean reservoirs typically are at a temperature of about 400° to 700° F. and a pressure of about 400 to 700 psig. When the geothermal fluid moves through the reservoir to a well and ascends through the well to the surface, the temperature of the fluid stream can drop as much as 100° F. or more, and the pressure is also substantially reduced. When the geothermal fluid is utilized, for example as a source of heat or to generate power, it is passed through various conduits. For example, the conduits through which a hot geothermal fluid produced from a well passes during its utilization to generate power in a power plant include one or more wellhead separators in which the major portion of the produced gas phase of the geothermal fluid is separated from the liquid phase, a flash vessel wherein the pressure on the hot liquid phase is reduced to cause a portion of the liquid to flash to steam, a steam turbine/generator which produces the power, a pump for reinjection of the spent brine back into a subterranean reservoir and the various conduits connecting these units.

During such utilization the temperature of the fluid stream can drop as much as an additional 100° F. or more, and the pressure is also further reduced. The hot pressurized spent geothermal fluid is then ready for disposal, such as by reinjection into a subterranean reservoir. Sometimes, prior to reinjection, the spent geothermal fluid is blended with a cold brine from another source and condensate from the power plant which also must be disposed of. During such blending of the fluid to be reinjected, the temperature can drop further to about 185° F. or lower.

When a change in conditions occurs, e.g., a reduction in pressure or an increase in temperature, during the passage of a hot liquid water-containing stream through a conduit, a portion of the water phase can flash to steam. When the liquid phase also contains dissolved solids, the solids may decompose to form anions with at least a portion of the decomposition products flashing into the vapor phase. For example, if the water phase contains dissolved bicarbonate ions, the bicarbonate ion decomposes as follows:

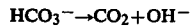
$$HCO_3^- \rightarrow CO_2 + OH^-$$

The carbon dioxide partitions into the gas phase while the hydroxyl ions remain in the liquid phase. The carbon dioxide can cause corrosion of any metal conduit with which it comes in contact and/or combine with alkaline earth metal cations also present in the fluid stream to form a scale which adheres to the surfaces of the pores in the reservoir, the wellbore and other conduits and builds up in thickness over a period of time. Carbon dioxide is believed to cause corrosion by combining with water present in the system to form carbonic acid, a known corrosive. It is believed that scale formation is increased by the increase in alkalinity when carbon dioxide flashes. Similarly, silica can flash and form silicate scales. As the fluid flow continues, the corrosion can cause failure of the conduit and/or the scale build up can continue until the pore throats in the reservoir, the wellbore and other conduits become so plugged with scale that continued flow of fluids through the conduits is impaired. Often additional energy is required to maintain the desired rate of flow of fluids through the system. In some instances a substantially complete plugging of the conduits occurs, necessitating a costly cessation of further operations for expensive maintenance and repair.

One operation in which such a hot liquid watercontaining stream is passed through a conduit is in the generation of steam. In most non-geothermal steam generation systems, the boiler feedwater used is relatively pure. However, since the steam withdrawn is of even higher purity, contaminants entering with the boiler feedwater, even in small concentrations, accumulate in the boiler water. These contaminants, if not removed or treated, can interfere with boiler operation. They can cause corrosion, interfere with steam-water separation, or form deposits on the interior surfaces of the heat-absorbing components of the fluid handling system. Such deposits increase metal temperatures and result in eventual failure of the pressure parts due to overheating.

Geothermal wells and steam collecting facilities present even more severe scale deposition and corrosion difficulties. One source of recoverable natural energy is geothermal energy stored in hot subterranean reservoirs. One way of utilizing this geothermal energy involves drilling one or more wells into the reservoir which may contain either a geothermal fluid or hot dry rocks. If it contains a geothermal fluid, i.e., steam brine, or a mixture of steam and brine, the fluid may be produced via a well. If it contains only hot dry rocks, a relatively low temperature heat exchange fluid, generally water, is passed through the reservoir and recovered via a well after it has been heated by the rocks. In either instance, the process involves, in part, the production of geothermal fluid from a reservoir to the surface via a well, subsequent handling of the fluid to utilize the geothermal energy, and usually reinjection of the fluid back into the same or a different reservoir. Such utilization may involve generation of electric power by a turbine driven by geothermal energy, passing the fluid through a helical rotary screw expander power system, using geothermal fluid in a binary power cycle with a working fluid such as isobutane in a regenerative heat exchanger, or direct utilization for its heat, water, or minerals content, for space heating or process heating.

Within the reservoir the geothermal fluid exists at a high temperature and pressure. Under such conditions this aqueous fluid characteristically contains considerable amounts of various anions and cations dissolved from the reservoir rock, for example, sodium, potassium, calcium, magnesium, barium and iron cations and chloride, carbonate, bicarbonate, silicate, sulfate and sulfide anions. Among the more troublesome scales are the alkaline earth metal carbonates, such as calcium carbonate, and silicate scales. Silicate scales are often complex and contain a number of cations. In many instances the scale is a mixture of two or more chemical compounds. For example, calcium carbonate can deposit in a mixture with a silicate scale. Deep, hot oil and/or gas producing wells also can produce brine which contains similar scale-forming components.

As the geothermal fluid is produced from the reservoir via a well, utilized, and reinjected, certain changes take place. These changes include lowering of both the temperature and pressure of the fluid, flashing of at least a portion of the liquid component of the fluid and possibly mixing of two or more geothermal fluids of different composition coming from different strata of the reservoir. As a result of these and other changes, salts precipitate and tend to adhere as hard deposits onto the surfaces of the pores in the reservoir and/or on to the metal surfaces in the well and surface conduits with which they come in contact, e.g., the downhole and surface fluid handling equipment including flow lines, pumps, valves, rods, heat exchangers and the like. While the exact composition of these precipitates varies widely and can include combinations of any of the above-mentioned anions and cations, carbonate-containing scales have been found to be especially troublesome. As carbon dioxide, hydrogen sulfide and other gases flash, they contact and tend to corrode the metal in the system. Corrosion can even accelerate buildup of scale deposits because the resulting corroded rough metal surfaces offer convenient sites to which scale crystals can adhere. A buildup of scale can sometimes concentrate and localize corrosive attack. Scale formation is also undesirable because it cuts down the heat transfer which can otherwise be achieved and can reduce the flow capacity of the system due to at least partial plugging of the flow passages by the scale. It has been found that the above-described corrosion and/or scale formation problems can be alleviated by introducing into the water-containing fluid stream, at a point before a substantial amount of flashing has occurred, an effective amount of a treating fluid comprising a solution of a water-soluble ammonium salt, quaternary ammonium salt, amine salt or amide. Optionally the treating fluid also contains a buffering agent. Preferably the solution also contains a water-soluble or dispersible polymer. The treating fluid can be mixed into the hot water-containing fluid stream downhole in the production well at a point near the producing strata as though a coiled tubing string anchored near the bottom of the well. Alternatively, a large volume of a dilute treating fluid can be prepared at the surface and injected down the well and into the reservoir. After the treating fluid has been heated to near reservoir temperature, it is produced back out of the reservoir, into the well, and to the surface. The treating fluid can also be mixed into the hot water-containing fluid stream at various points in the surface facilities, as being introduced into conduits leading to a wellhead separator, the flash vessel, the turbine/generator and/or the reinjection pump.

While the mechanism by which the treating fluid functions in controlling scale formation and or corrosion is not completely understood, it is believed that in flashing the compound which provides a nitrogen-containing cation decomposes as follows, using ammonium chloride as an example:

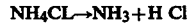

$NH_4Cl \rightarrow NH_3 + HCl$

The ammonia partitions into the gas phase while the hydrogen chloride remains in the liquid phase. These cations appear to flash at about the same time as the previously-described scale-forming anions. It is believed that the acid, e.g., hydrochloric acid remaining in the liquid phase after decomposition of the nitrogen-containing cation, e.g., ammonium ion, neutralizes the alkaline anion, e.g., hydroxy ion, remaining in the liquid phase after decomposition of the scale-forming anion, e.g., bicarbonate ion, and is buffered in the liquid phase. Thus, it is believed that the buffered decrease in the alkalinity of the aqueous phase inhibits scale formation and also corrosion.

The amount of treating agents required will vary with the particular treating agent employed as well as the nature of the salts dissolved in the liquid water portion of the fluid stream and/or the composition of the scale formed. In general it has been found that about 2 to 50, preferably 5 to 10 milliequivalents of the nitrogen-containing cations per liter of the fluid stream have been effective in inhibiting and or removing 5 to 10 milliequivalents of scale respectively. When a polymer is included in the treating fluid, an effective amount of the polymer is about 5–100 parts per million by weight of the total fluid stream. An effective amount of a buffering agent, e.g., bicarbonate ion, is normally contained in the fluid stream. However, when a large volume of the treating fluid is not added to the fluid stream but is used independently of the fluid stream to remove 5 to 10 milliequivalents of the scale already formed, 0.2 to 0.4 milliequivalents of a buffering agent and an additional 0.3 to 0.5 milliequivalents of the nitrogen-containing cation are added per liter of the treating fluid prepared with 5 to 10 milliequivalents of cation per liter, respectively.

The water-soluble compound which provides a nitrogen-cation capable of flashing to become a gas at high temperatures suitable for use in this invention is selected from the group consisting of ammonium halides, ammonium salts of inorganic acids, ammonium salts of organic acids, quaternary ammonium halides, quaternary ammonium salts of inorganic acids, quaternary ammonium salts of organic acids, amine hydrochlorides, amine salts of inorganic acids, amine salts of organic acids and amides.

Examples of suitable ammonium halides include ammonium chloride, ammonium bromide, ammonium fluoride, ammonium bifluoride and ammonium iodide. Particularly good results have been obtained with ammonium chloride.

Examples of suitable ammonium salts of an inorganic acid include ammonium nitrate, ammonium nitrite, ammonium sulfate, ammonium sulfite, ammonium sulfamate, ammonium carbonate, ammonium borate, ammonium chromate and ammonium dichromate. Ammonium nitrate is preferred.

Examples of suitable ammonium salts of an organic acid include ammonium salts of mono-, di-, and tri-chloracetic acids, ammonium formate, ammonium acetate, ammonium citrate, ammonium tartrate, ammonium gallate, ammonium glyoxylate and ammonium benzoate.

Examples of ammonium salts of alpha hydroxy organic acids include ammonium glycolate and ammonium lactate.

The quaternary ammonium halides for use in this invention can be represented by the general formula:

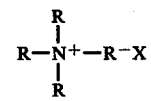

$$R-\underset{\underset{R}{|}}{\overset{\overset{R}{|}}{N^+}}-R-X$$

wherein at least one of the R groups is an organic hydrophobic group having 1 to 20 carbon atoms. The other substituents are independently alkyl or hydroxyalkyl groups having 1 to 4 carbon atoms, benzyl groups or alkoxy groups of the formula $(C_2H_4O)_nH$ or $(CH_3H_6O)_nH$ where n is 2 to 10. The preferred anion in the quaternary anion of the quaternary ammonium compound is chloride. This can be replaced by various other anions, such as bromide, iodide or ethylsulfate ions.

Exemplary of suitable quaternary ammonium compounds are tetramethyl ammonium chloride, dioctyl dimethyl ammonium chloride, dodecyl trimethy ammonium chloride, cetyl trimethyl ammonium chloride, cetyl trimethyl ammonium bromide, dodecyl trimethyl benzyl ammonium chloride, ethyltrimethyl ammonium iodide, iodomethyltrimethyl ammonium iodide, tetraethyl ammonium ennea-iodide, tetraethyl ammonium hepta-iodide and methyl pyrridinium chloride. Particularly good results have been obtained with tetramethyl ammonium chloride.

Quaternary ammonium salts of inorganic acids for use in this invention include compounds similar to those having the above formula only the anion is an inorganic acid rather than a chloride. Exemplary of suitable compounds are tetramethyl ammonium nitrate, dioctyl dimethyl ammonium nitrite, dodecyl trimethyl ammonium sulfate and similar compounds containing the sulfite, sulfonate, carbonate, borate, chromate and dichromate anions.

Quaternary ammonium salts of organic acids for use in this invention include compounds similar to those having the above formula only the anion is an organic acid rather than a chloride. Exemplary of suitable compounds are tetramethyl ammonium formate, dioctyl dimethyl ammonium acetate, dodecyl trimethyl ammonium citrate and similar compounds containing the tartrate, gallate, glyoxylate and benzoate anions.

Also useful are amine hydrochlorides such as the mono-, di- and tri-alkyl amine hydrochlorides wherein the alkyl group contains 1 to 20 carbon atoms, straight chain or branched, aryl amine hydrochlorides, hydroxysubstituted amine hydrochlorides and heterocyclic-substituted amine hydrochlorides. Examples of suitable materials include methylamine hydrochloride, ethylamine hydrochloride, propylamine hydrochloride, butylamine hydrochloride, dodecylamine hydrochloride, eicosylamine hydrochloride, diethylamine hydrochloride, triethylamine hydrochloride, benzylamine hydrochloride, naphthylamine hydrochloride, hydroxylamine hydrochloride, 2-aminopyridine hydrochloride and 4-aminopyridine hydrochloride. Particularly good results have been obtained with butylamine hydrochloride.

Amine salts of inorganic acids which can be used include ethylamine hydronitrate, butylamine nitrite, dimethylamine sulfate, dodecylamine sulfite, and similar amine salts of sulfamate, carbonate, borate, chromate, and dichromate anions.

Suitable amine salts of organic acids which can be used include methylamine formate, diethylamine acetate, triethyl amine citrate, butylamine tartrate, and similar amine salts of gallate, glycoxylate, benzoate, and mono-di-, and tri-chloroacetic acid anions.

Suitable amides include tertiary carboxylic acid alkylated amides characterized by the formula:

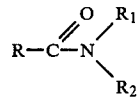

wherein (1) R is hydrogen or an alkyl group containing 1 to about 8 carbon atoms, and (2) $R_1$ and $R_2$ are the same or different alkyl groups containing 1 to about 8 carbon atoms.

Preferred alkylated amides are N,N-dimethylformamide, N,N-diethylformamide, N,N-dimethylacetamide, N,N-diethylacetamide, N-N-dipropylacetamide, N,N-dimethylpropionamide. Other alkylated amides which may be used include N-methyl, N-methylacetamide, N-methyl, N-octylpropionamide, N-methyl, N-hexyl n-butyramide, N-methyl, N-propylcaproamide, N-N-diethylcaprylamide and the like. N-N-dimethylformamide, hereinafter referred to as DMF, is especially preferred.

Other amides which can be employed are the water-soluble amides of carbamic acid, for example, urea, biuret, thiourea, ammonium carbamate, and derivatives of urea such as monomethylolurea and dimethylolurea.

While aqueous solutions of the above-described compounds which provide a nitrogen-containing cation are effective in a treating fluid added to a hot water-containing fluid stream to reduce scale formations and to dissolve scale already formed, it is even more effective to include in the treating fluid a water-soluble or dispersible polymer. The polymer-containing treating fluid appears to extend the area over which the treating fluid is effective, e.g., scale is removed or prevented from forming over a greater area of the conduit downstream from the point of addition of the treating fluid to the hot water-containing fluid stream.

Suitable water-soluble or dispersible polymers for use in this invention include both natural and synthetic polymeric materials selected from the group consisting of polyacrylamide, partially hydrolyzed polyacrylamide, polyacrylic acid, polyvinyl alcohol, polyvinyl pyrrolidone, polystyrene sulfonate, polyethylene oxide, a heteropolysaccharide produced by bacteria of the genus Xanthomonas, cellulose derivatives, gums and starches. The molecular weight of these polymers can vary over a wide range, e.g., 10,000 to 25,000,000. Pearl starch is preferred.

Gums are natural or modified polysaccharides or their derivatives that hydrate in water to form viscous solutions or dispersions. Natural gums useful in this invention include seaweed extracts, such as agar, algin and carrageenan, plant exudates, such as gum arabic, gum karaya, gum tragacanth and gum ghatti; gums from seeds or roots, such as guar gum, locust bean gum, tamarind gum, psyllium seed gum, quince seed gum, larch gum and pectin; and gums obtained by microbial fermentation, such as extran and xanthan. Modified gums which may be used include cellulose and starch derivatives and certain synthetic gums such as low-methoxyl pectin, propylene glycol alginate, triethanolamine alginate, carboxymethyl locust bean gum and carboxymethyl guar gum. Specific cellulose derivatives which may be used are methylcellulose, ethylcellulose, carboxymethylcellulose and carboxymethylhydroxyethylcellulose. Specific starch derivatives are starches from corn, high-amylose corn, potato, wheat, sorghum, rice, arrow-root and cassava. Also included are modified starches, such as thin-boiling starches made by a partial hydrolysis with acid, and oxidized starches made by treating starch with hypochlorite.

The region of the conduit over which the scale-forming materials in the fluid stream begins to flash is approximately the same as the region over which the ammonium or substituted ammonium compounds begin to flash. However, the two regions do not overlap each other exactly. In laboratory tests to be described later, it is determined that in the absence of any treating materials, most of the scale from the scale-forming materials deposits in a conduit near where these materials begin to flash. When a solution of an ammonium or substituted ammonium compound is added to the system, there is some effect in inhibiting formation of scale, dissolving scale already deposited and inhibiting corrosion.

When an aqueous solution of a polymer is added to the fluid stream in the absence of a compound which provides a nitrogen-containing cation, there is little effect in inhibiting formation of scale, dissolving scale already deposited or inhibiting corrosion. However, the scale is deposited more uniformly over the surface of the conduit from the point where flashing begins to the upper end of a vertically positioned conduit rather than being concentrated near the point where flashing begins.

When the fluid stream contains a solution of both a compound which provides a nitrogen-containing cation and a polymer, formation of scale is inhibited, scale previously deposited is dissolved and corrosion is inhibited. Thus, it appears that the polymer expands the region over which both the scale-forming components and the compound which provides a nitrogen-containing cation flash.

A lesser amount of the treating agent mixture is required to remove a scale than to inhibit its deposition. When a scale is deposited from a fluid stream, It is believed that only a small proportion of the potential scale-forming components actually flash and form scale with the remainder passing on through the conduit. If it is desired to inhibit scale formation, treating material is preferably added to the fluid stream continuously throughout the entire operation.

The invention is further illustrated by the following examples which are illustrative of various aspects of the invention and are not intended as limiting the scope of the invention as defined by the appended claims.

Examples 1 to 49

A series of laboratory tests is made to simulate the scale build up caused by the flashing of a brine to steam when passing through a conduit. A vertically positioned conduit is made up of eight axially aligned sections of 0.563 inch outside diameter, 0.359 inch inside diameter, 4 inches long type 316 stainless steel coned and threaded nipples attached with type 316 stainless steel couplings. The conduit is wrapped first with aluminum foil, next with a heating tape and finally with a layer of glass wool insulation. The tube is partially filled with distilled water, the heating tape is turned on and the temperature of the conduit itself rises to 325° F.

When the distilled water begins to boil, a 500 milliliter or 2,000 milliliter sample of a potentially scale-forming test solution is slowly and continuously fed into the bottom of the conduit via a U tube and passed upwardly therethrough. As the test solution boils, the feed rate is adjusted to maintain the liquid level at about the mid point of the conduit. The vapors generated pass out the top of the conduit and into a rubber tubing attached to a condenser where they condense. The resulting liquid is collected and visually observed. It takes about one half hour and about four hours, respectively, for the 500 milliliter and the 2,000 milliliter samples to pass through the conduit. When all of the test solution has been introduced into the conduit, it is followed by 100 milliliters of 5 percent by weight sodium chloride brine. The heating tape is turned off. The insulation, heating tape and aluminum foil are removed and the conduit allowed to cool to ambient temperature. The conduit is disassembled and the interior thereof visually examined for the presence of scale. When some scale is observed to be formed, the interior of the conduit is contacted with an aqueous solution of 4½ percent by weight hydrochloric acid to dissolve the scale. The amount of scale present is determined by titration with a 0.01 molar aqueous solution of the tetra sodium salt of ethylenediamine-tetraacetic acid using the dye Erichrome Black T as an indicator. The results of these tests are given in Table 1. In examples 1 and 2 in which the test solution contains scale-forming ions but no treating agents, the scale formed forms principally in the portion of the vertically positioned tubing in the vicinity of the liquid level. In examples 3 to 7 in which the test solution contains an ammonium compound as a treating agent but no polymer treating agent, a substantial reduction in scale formation is achieved. In examples 8 to 10 in which the test solution contains various polymer treating agents but no treating agent which provides a nitrogen-containing cation, there is negligible effect in inhibiting scale formation. However, it is observed that the scale formed extends uniformly from the liquid level to the top of the vertically positioned tubing. In examples 11 through 49 the test solution contains various concentrations of both various compounds which provide a nitrogen-containing cation and various polymers. The reduction in scale formation is generally excellent except in examples 11 and 22 where the concentration of treating agent is not high enough to prevent appreciable scale formation. The reason for the poor results of test 34 is not understood.

TABLE 1

SCALE INHIBITION IN A CONDUIT

Aqueous Brine Containing 5% by Wt. NaCl, Saturated with $CO_2$, and also containing the following:

| Example Number | Size of Sample (milliliters) | $CaCl_2$ (grams/liter) | $NaHCO_3$ (grams/liter) | $NH_4Cl$ (grams/liter) | Polymer (grams/liter) | | Equivalents of $Ca^{++}$ Ion Deposited On the Conduit Wall | Reduction in Scale Formation (%) |
|---|---|---|---|---|---|---|---|---|
| 1 | 500 | 1.110 | 1.680 | none | none | | 0.00349 | — |
| 2 | 2,000 | 0.2775 | 0.420 | none | none | | 0.00507 | — |
| 3 | 500 | 1.110 | 1.680 | 0.268 | none | | 0.00352 | 0 |
| 4 | 2,000 | 0.2775 | 0.420 | 0.268 | none | | 0.0006 | 98.8 |
| 5 | 500 | 1.110 | 1.680 | 0.535 | none | | 0.00247 | 29.2 |
| 6 | 500 | 1.110 | 1.680 | 0.803 | none | | 0.00177 | 49.3 |
| 7 | 500 | 1.110 | 1.680 | 1.070 | none | | 0.00085 | 75.6 |
| 8 | 500 | 1.110 | 1.680 | none | 0.2 | Xanthan Gum* | 0.00345 | 0 |
| 9 | 500 | 1.110 | 1.680 | none | 0.2 | Partially hydrolyzed polyacrylamide | 0.00302 | 23.1 |
| 10 | 500 | 1.110 | 1.680 | none | 0.2 | polyacrylamide | 0.00415 | 0 |
| 11 | 500 | 1.110 | 1.680 | 0.268 | 0.2 | Xanthan Gum* | 0.00247 | 14.9 |
| 12 | 500 | 1.110 | 1.680 | 0.535 | 0.2 | Xanthan Gum* | 0.00195 | 44.1 |

TABLE 1-continued

SCALE INHIBITION IN A CONDUIT

Aqueous Brine Containing 5% by Wt. NaCl, Saturated with $CO_2$, and also containing the following:

| Example Number | Size of Sample (milliliters) | $CaCl_2$ (grams/liter) | $NaHCO_3$ (grams/liter) | $NH_4Cl$ (grams/liter) | Polymer (grams/liter) | | Equivalents of $Ca^{++}$ Ion Deposited On the Conduit Wall | Reduction in Scale Formation (%) |
|---|---|---|---|---|---|---|---|---|
| 13 | 500 | 1.110 | 1.680 | 0.803 | 0.2 | Xanthan Gum* | 0.00006 | 98.3 |
| 14 | 500 | 1.110 | 1.680 | 1.070 | 0.2 | Xanthan Gum* | 0 | 100 |
| 15 | 500 | 1.110 | 1.680 | 1.070 | 0.025 | Xanthan Gum* | 0.00024 | 93.1 |
| 16 | 500 | 1.110 | 1.680 | 1.070 | 0.05 | Xanthan Gum* | 0 | 100 |
| 17 | 500 | 1.110 | 1.680 | 1.070 | 0.2 | Xanthan Gum* | 0.00117 | 70.1 |
| 18 | 500 | 0.555 | 0.840 | 0.535 | 0.05 | Partially hydrolyzed polyacrylamide | 0 | 100 |
| 19 | 500 | 1.110 | 1.680 | 1.070 | 0.05 | Partially hydrolyzed polyacrylamide | 0.000325 | 90.7 |
| 20 | 2,000 | 0.2775 | 0.840 | 0.2675 | 0.2675 | Guar Gum | 0 | 100 |
| 21 | 2,000 | 0.2775 | 0.420 | 0.2675 | 0.0125 | Guar Gum | 0 | 100 |
| 22 | 2,000 | 0.2775 | 0.840 | 0.2675 | 0.0125 | Guar Gum | 0.00384 | 24.3 |
| 23 | 2,000 | 0.2775 | 0.840 | 1.070 | 0.0125 | Guar Gum | 0.000075 | 98.5 |
| 24 | 2,000 | 0.555 | 0.420 | 0.2675 | 0.0125 | Guar Gum | 0 | 100 |
| 25 | 2,000 | 2.22 | 0.420 | 0.2675 | 0.0125 | Guar Gum | 0.000135 | 97.3 |
| 26 | 500 | 1.110 | 1.68 | 1.070 | 0.025 | Guar Gum | 0.000335 | 90.4 |
| 27 | 2,000 | 0.2775 | 0.840 | 0.2675 | 0.025 | Guar Gum | 0.00515 | 0 |
| 28 | 500 | 1.110 | 1.68 | 1.070 | 0.05 | Guar Gum | 0 | 100 |
| 29 | 2,000 | 0.555 | 0.840 | 0.535 | 0.05 | Guar Gum | 0 | 100 |
| 30 | 500 | 1.110 | 1.68 | 1.070 | 0.2 | Guar Gum | 0 | 100 |
| 31 | 2,000 | 0.2775 | 0.420 | 0.2675 | 0.0125 | Corn Starch | 0 | 100 |
| 32 | 2,000 | 0.2775 | 0.840 | 0.2675 | 0.0125 | Corn Starch | 0 | 100 |
| 33 | 2,000 | 0.2775 | 0.840 | 0.2675 | 0.0125 | Corn Starch | 0.00273 | 46.1 |
| 34 | 2,000 | 0.2775 | 0.840 | 0.2675 | 0.025 | Corn Starch | 0.00423 | 16.6 |
| 35 | 2,000 | 0.2775 | 0.420 | 0.2675 | 0.025 | Modified Starch | 0 | 100 |
| 36 | 500 | 0.555 | 0.840 | 0.535 | 0.05 | Modified Starch | 0.00064 | 86.7 |
| 37 | 500 | 0.555 | 0.840 | 0.535 | 0.025 | Carboxy methylcellulose | 0.000785 | 77.5 |
| 38 | 500 | 1.110 | 1.68 | 1.070 | 0.2 | Carboxy methylcellulose | 0 | 100 |
| 39 | 500 | 1.110 | 1.68 | 1.070 | 0.2 | Hydroxy-ethylcellulose | 0 | 100 |
| 40 | 500 | 1.110 | 1.68 | 1.070 | 0.05 | Kelzan X-C | 0 | 100 |
| 41 | 500 | 1.110 | 1.68 | 1.070 | 0.025 | " | 0.00006 | 98.28 |
| 42 | 500 | 1.110 | 1.68 | 1.070 | 0.025 | Guar Gum | 0.000335 | 90.40 |
| 43 | 500 | 1.110 | 1.68 | 1.070 | 0.05 | Pusher 1000 | 0.000325 | 90.69 |
| 44 | 500 | 1.110 | 1.68 | 1.070 | 0.05 | Guar Gum | 0 | 100 |
| 45 | 500 | 0.555 | 0.840 | 0.535 | 0.025 | CMC | 0.000785 | 77.51 |
| 46 | 500 | 0.555 | 0.840 | 0.535 | 0.05 | Pusher 1000 | 0 | 100 |
| 47 | 500 | 0.555 | 0.840 | 0.535 | 0.05 | Kelzan X-C | 0.000575 | 83.52 |
| 48 | 500 | 0.555 | 0.840 | 0.535 | 0.058 | Staley M. Starch | 0.00064 | 86.66 |
| 49 | 500 | 0.555 | 0.840 | 0.535 | 0.05 | Polyvinyl Alc. | 0.0010 | 71.35 |

*Kelgan, etc.

While the aforementioned tests are carried out using stainless steel equipment, similar tests using carbon steel conduits show that the treating solution employed in this invention is not unduly corrosive to carbon steel. The corrosion can be further reduced by incorporating a buffering agent into the treating solution. Geothermal fluids usually contain a substantial concentration of hydrogen carbonate ions which act as a buffer. If a large volume of treating solution is to be employed relative to the amount of geothermal fluid produced, it is preferred to add an alkali metal hydrogen carbonate as a buffering agent to the treating solution.

EXAMPLE 50

A geothermal well has a total depth of 5,149 feet and is equipped with 9⅜ inch diameter casing to 2,312 feet and 7-inch diameter casing from 2,312 feet to total depth. The well initially produces about 680,000 pounds per hour of geothermal fluid at 150 psi with a 28.4 weight percent steam fraction. After about one month's production, the production declines to about 232,000 pounds per hour of brine at 68 psi with 27.5 weight percent steam fraction. The reason for this decline in production is believed due to the formation and build up in the casing and in the producing reservoir in the vicinity of the well of calcite scale to the point where further flow of geothermal fluid through the casing and the reservoir is restricted. Probes run down the casing indicate scale build up around the 2,312 foot level in the well where the 9⅜ inch diameter casing connects to the 7 inch diameter casing and below. It is estimated that the casing contains about 33,000 pounds of calcite scale. At the surface, 426 barrels of a treating agent concentrate are prepared by adding to fresh water 1 pound per gallon of ammonium chloride and 0.0568 pound per gallon of sodium bicarbonate buffering agent. Thus, the 426 barrels of treating agent concentrate contains 17,857 pounds of ammonium chloride and 992 pounds of sodium bicarbonate. There is injected down the well under vacuum at a rate of 17 barrels per minute a treating agent solution comprising a mixture of the treating agent concentrate and additional fresh water in the ratio of 1 gallon of the treating agent concentrate to 6 barrels additional fresh water. A total of 103,800 barrels of treating agent solution is injected. The well is shut in for 10 hours. During the shut in period, a series of probes having various diameters is lowered down the casing and the depth each probe reaches before encountering an obstacle (scale) is determined. After this length of time, the well is opened and begins to flow. The mass flow rate following the treatment increases to 164 percent of the flow rate prior to the treatment. The series of probes are again lowered down the casing on both the 25th and the 32nd day following the treatment. It is found that the scale is substantially removed from the casing over the interval from 2,485 feet to 3,720 feet during the 25 days of production following the treatment. After 7 additional days of production, there is no additional scale build up. From the difference in depth to which the probes could be lowered 25 days following the treatment compared to just after the treatment, it is calculated that the treatment removes 18,132 pounds of scale from the casing.

| | MAXIMUM DEPTH TO WHICH PROBE IS LOWERED (FEET) | | |
|---|---|---|---|
| Probe Diameter (inches) | During the Shut In Period | 25 Days Following Treatment | 32 Days Following Treatment |
| 6 | 2485 | 2290 | 2290 |
| 5 | 3113 | 3720 | 3720 |
| 4 | 3680 | 3720 | 3720 |
| 3 | 3681 | 3720 | 3720 |
| 1.5 | 3692 | 3720 | 3720 |

Normally, the geothermal fluid produced contains less than 1 percent of noncondensable gases (carbon dioxide). During the 32 day period following the treatment, the produced geothermal fluid contains in excess of 10 percent of noncondensable gases. This indicates that during this period the scale inhibition reaction between ammonium chloride and the bicarbonate ion to form carbon dioxide is still taking place. This continuing inhibition of scale build up confirms the finding of the probe measurements.

EXAMPLE 51

In another similar geothermal producing well the production rate declines to approximately ⅓ of the initial production rate after being produced one month. A drilling bit is run down the casing through the interval over which probes indicate scale to have formed. A ¾ inch diameter coiled tubing is run down the clean casing to just above the producing interval and anchored in place. An aqueous treating solution is prepared by adding to fresh water 3 pounds per gallon of ammonium nitrate and 0.3 pound per gallon of pearl starch. The well is returned to production and simultaneously and continuously the aqueous treating solution is injected down the coiled tubing at the rate of 1 gallon per minute. The treating solution mixes with the produced geothermal fluid near the producing interval and the resulting mixture of fluids flows up the casing and out of the well. Throughout 6 months of production while treating the well in this manner a high production rate is maintained. This indicates that no appreciable amount of scale is being formed in the casing during production.

EXAMPLE 52

In a geothermal well similar to those described in the previous two examples, an initial high production rate falls considerably after the well is produced about 1 month. It is suspected that calcite scale may be forming in the well casing. A ¾ inch diameter coiled tubing is run into the well to just above the producing formation and anchored near the bottom thereof. While the well is being produced there is injected down the coiled tubing 1 gallon per minute of an aqueous solution containing 2 pounds per gallon ammonium chloride. The treatment is continued for 10 days during which time the concentration of the ammonium chloride in the aqueous treating solution is gradually increased until there is being injected 1 gallon per minute of an aqueous solution containing 6 pounds per gallon of ammonium chloride. After the 10 day treatment, the production rate increases to about 685,000 pounds per hour of geothermal fluid. This indicates that the scale is substantially completely removed. Treatment of the well with 1 gallon per minute of an aqueous solution containing 2 pounds per gallon of ammonium chloride during subsequent production of the well maintains the casing essentially free of calcite scale.

While various specific embodiments and modifications of this invention have been described in the foregoing specification, further modifications will be apparent to those skilled in the art. Such further modifications are included within the scope of this invention as defined by the following claims:

I claim:

1. A method for treating a fluid stream passing through a conduit, which fluid stream contains liquid hot water and which water contains dissolved salts, to inhibit formation of scale in the conduit and/or to dissolve scale previously formed, comprising:

(a) mixing with said fluid stream a treating agent comprising a water-soluble compound, which provides a nitrogen-containing cation capable of flashing to become a gas at high temperatures, selected from the group consisting of ammonium halides, ammonium salts of inorganic acids, ammonium salts of organic acids selected from the group consisting of mono-, di-, and tri-chloracetic acids, formic acid, acetic acid, citric acid, tartaric acid, gallic acid, glyoxylic acid, and benzoic acid, ammonium salts of alpha hydroxy organic acids, quaternary ammonium halides, quaternary ammonium salts of inorganic acids, quaternary ammonium salts of organic acids, amine hydrochlorides, amine salts of inorganic acids, amine salts of organic acids, and amides characterized by the formula:

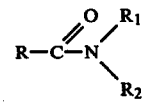

wherein R is hydrogen or an alkyl group containing 1 to about 8 carbon atoms, and $R_1$ and $R_2$ are the same or different alkyl groups containing 1 to about 8 carbon atoms; and (b) flashing at least a portion of the liquid hot water to steam.

2. The method defined in claim 1 wherein said fluid stream also contains steam.

3. The method defined in claim 1 wherein said fluid stream is from a subterranean reservoir.

4. The method defined in claim 3 wherein said fluid stream is a geothermal fluid stream.

5. The method defined in claim 1 wherein the liquid hot water is at a high enough temperature so that at least a portion of the liquid water flashes to steam when the pressure of the fluid stream is decreased.

6. The method defined in claim 5 wherein the fluid stream is at a temperature of about 400° to 700° F. and a pressure of about 400 to 700 psig.

7. The method defined in claim 1 wherein about 2 to 50 milliequivalents of a compound which provides a nitrogen-containing cation per liter of the fluid stream is employed.

8. The method defined in claim 1 wherein about 5 to 10 milliequivalents of a compound which provides a nitrogen-containing cation per liter of the fluid stream is employed.

9. The method defined in claim 1 wherein the compound which produces a nitrogen-containing cation is added as an aqueous solution.

10. The method defined in claim 9 wherein the aqueous solution contains about 0.5 to 10 pounds per gallon of the compound which produces a nitrogen-containing cation.

11. The method defined in claim 9 wherein the aqueous solution of the treating agent also contains an effective amount of a buffering agent.

12. The method defined in claim 9 wherein the aqueous solution of the treating agent contains 0.2 to 0.4 milliequivalents per liter of a buffering agent.

13. The method defined in claim 12 wherein the buffering agent is sodium bicarbonate.

14. The method defined in claim 1 wherein the compound which provides a nitrogen-containing cation is ammonium chloride.

15. The method defined in claim 1 wherein the compound which provides a nitrogen-containing cation is ammonium nitrate.

16. The method defined in claim 1 wherein the compound which provides a nitrogen-containing cation is tetramethyl ammonium chloride.

17. The method defined in claim 1 wherein the compound which provides a nitrogen-containing cation is butylamine hydrochloride.

18. The method defined in claim 1 wherein the treating agent also contains an effective amount of a water-soluble or water-dispersible polymer.

19. The method defined in claim 18 wherein the said polymer is selected from the group consisting of polyacrylamide, partially hydrolyzed polyacrylamide, polyacrylic acid, polyvinyl alcohol, polyvinyl pyrrolidone, polystyrene sulfonate, polyethylene oxide, a heteropolysaccharide produced by bacteria of the genus xanthomonas, cellulose derivatives, gums and starches.

20. The method defined in claim 18 wherein the fluid stream contains about 5 to 100 parts per million by weight of the polymer.

21. The method defined in claim 1 wherein the compound which provides a nitrogen-containing cation is N-N-dimethylformamide.

22. A method for treating a well penetrating a reservoir producing a fluid stream containing liquid hot water, which water contains dissolved salts, to inhibit formation of a scale in the reservoir in the immediate vicinity of the well, in the well itself, and in the fluid handling equipment associated with the well contacted by the fluid stream, and/or to dissolve scale previously formed, comprising:

(a) mixing with the fluid stream a treating agent comprising a water-soluble compound, which provides a nitrogen-containing cation capable of flashing to become a gas at high temperatures, selected from the group consisting of ammonium halides, ammonium salts of inorganic acids, ammonium salts of organic acids selected from the group consisting of mono-, di-, and tri-chloracetic acids, formic acid, acetic acid, citric acid, tartaric acid, gallic acid, glyoxylic acid, and benzoic acid, ammonium salts of alpha hydroxy organic acids, quaternary ammonium halides, quaternary ammonium salts of inorganic acids, quaternary ammonium salts of organic acids, amine hydrochlorides, amine salts of inorganic acids, amine salts of organic acids, and amides characterized by the formula:

$$R-C(\!=\!\!O)-N(R_1)(R_2)$$

wherein R is hydrogen or an alkyl group containing 1 to about 8 carbon atoms, and $R_1$ and $R_2$ are the same or different alkyl groups containing 1 to about 8 carbon atoms; and (b) producing the well under conditions at which at least a portion of the liquid hot water flashes to steam.

23. The method defined in claim 22 wherein the fluid stream is a geothermal fluid stream.

24. The method defined in claim 22 wherein about 2 to 50 milliequivalents of a compound which provides a nitrogen-containing cation per liter of the fluid stream is employed.

25. The method defined in claim 22 wherein about 5 to 10 milliequivalents of a compound which provides a nitrogen-containing cation per liter of the fluid stream is employed.

26. The method defined in claim 23 wherein the aqueous solution of the treating agent also contains an effective amount of a water-soluble or water-dispersible polymer.

27. The method defined in claim 22 wherein the compound which provides a nitrogen-containing cation is ammonium chloride.

28. The method defined in claim 22 wherein the treating agent is added as an aqueous solution.

29. The method defined in claim 28 wherein the aqueous solution of the treating agent also contains an effective amount of a buffering agent.

30. The method defined in claim 28 wherein the aqueous solution of the treating agent is injected into the reservoir surrounding the well, the well is shut in until the temperature of the injected aqueous solution of the treating agent approximately reaches the reservoir temperature, and the well is produced.

31. The method defined in claim 22 wherein the treating agent is injected into the fluid stream at or near the producing interval of the reservoir.

32. The method defined in claim 22 wherein the compound which provides a nitrogen-containing cation is N-N-dimethylformamide.

* * * * *